Patented Sept. 18, 1945

2,384,975

UNITED STATES PATENT OFFICE 2,384,975

SOLID INTERPOLYMER OF AN ISOOLEFIN AND A NONCONJUGATED DIOLEFIN

William J. Sparks, Elizabeth, and Robert M. Thomas, Union, N. J., assignors, by mesne assignments, to Jasco, Incorporated, a corporation of Louisiana No Drawing. Application September 6, 1941, Serial No. 409,907

31 Claims. (Cl. 260—79)

This invention relates to hydrocarbon polymers; relates particularly to interpolymers or heteropolymers of an isoolefin with a polyolefin, and relates particularly to sulfurizable interpolymers of an isoolefin with a non-conjugated tertiary diolefin.

As shown in our copending application, Serial No. 182,252, filed Dec. 29, 1937, and Serial No. 300,336, filed Oct. 20, 1939 it has been found possible to produce copolymers or interpolymer of an isoolefin such as isobutylene with a conjugated diolefin such as butadiene or isoprene, or pentadiene, or dimethyl butadiene, by a low temperature technique, utilizing an active metal halide, or Friedel-Crafts type catalyst, dissolved in a low freezing non-complex-forming solvent. The resulting polymers have iodine numbers ranging between 1 and 50, molecular weights ranging from 15,000 to 150,000, or above and are reactive with sulfur in a curing reaction by which the plasticity of the polymer is largely destroyed and replaced by an elastic limit at which the material has a tensile strength ranging from 2,000 to 5,000 pounds per square inch and an elongation ranging from 300% to 1200%.

The resulting polymers are high grade materials much superior to natural rubber for many uses. The polymers do not, however, have all of the characteristics of natural rubber, nor all of the characteristics desirable for some particular uses, and, accordingly, means for modifying the characteristics of the material to adapt it to particular uses are desirable and important in the utilization of the polymer.

The present invention presents a new interpolymer or copolymer in which an isoolefin, which is preferably isobutylene, or may be 3-methyl butene-1, or 4-methyl pentene-1, is interpolymerized with a polyolefin, preferably a tertiary non-conjugated, diolefin having one double bond in the terminal position, attached to a tertiary carbon atom; the interpolymerization being accompanied by the application to a mixture of an isoolefin with a polyolefin, a dissolved active metal halide or Friedel-Crafts type catalyst at low temperatures ranging from —40° C. to —165° C. or lower. These interpolymers are capable of reacting with sulfur to form products which have tensile strengths greater than about 1500# per square inch.

A preferred embodiment of the invention utilizes the tertiary diolefin known as 2-methyl hexadiene-1,5, having the formula:

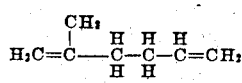

Alternatively, other tertiary diolefins such as 2-methyl pentadiene-1,4, having the formula:

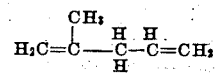

may be used or the 2-methyl heptadiene-1,6, having the formula:

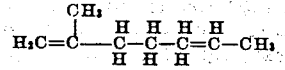

may be used. It is not necessary that both double linkages be terminal; and accordingly 2-methyl heptadiene-1,4, having the formula:

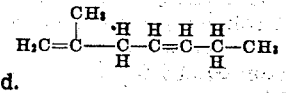

may be used.

These polyolefins may conveniently be represented by the general formula:

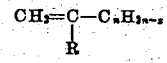

where R is an alkyl group but preferably a methyl group; where $n$ is any whole number greater than 2; and $x$ is any uneven number.

Likewise the substituent is not limited to methyl groups alone. Other substituents may be ethyl, propyl, butyl, and the like.

Thus an object of the present invention is to prepare an interpolymer of an isoolefin, such as isobutylene, with a non-conjugated tertiary polyolefin such as 2-methyl hexadiene-1,5 and similar polyolefins, to produce a polymer capable of curing with sulfur in which the unsaturation principally occurs in the side chains. Other objects and details of the invention will be apparent from the following description.

In practicing this invention, an olefinic mixture is prepared, consisting of the isoolefin, preferably isobutylene, with the tertiary diolefin, the isoolefin preferably being present in the ratio of 80 to 99 parts, with the tertiary diolefin in a proportion of 20 to 1 part. This olefinic mixture is preferably diluted with a diluent-refrigerant such as liquid ethylene or liquid ethane or liquid methane or mixtures of these several diluent-refrigerants together with other inert diluents such as liquid propane, liquid butane, liquid ethyl or methyl chlorides and the like, the diluent-refrigerant being present in the proportion of from 2 to 5 or 6 volumes per volume of mixed olefins. Alternatively, an excess of solid carbon dioxide may be utilized either with or without an auxiliary diluent such as propane, ethyl or methyl chloride or similar inert, low freezing substances. Alternatively, also, external cooling may be utilized by passing the reaction mixture through tubes submerged in a convenient refrigerant such as liquid ethylene or other convenient refrigerating means. The catalyst preferably consists of a solution of an active metal halide such as aluminum chloride, bromide or iodide or titanium chloride, or other Friedel-Crafts type catalyst dissolved in a low freezing solvent such as ethyl or methyl chloride or carbon disulfide or similar homologous substance. The catalyst solution is preferably applied in the form of a spray or mist onto the surface of the rapidly stirred mixture of the olefins and diluent-refrigerant or is likewise preferably applied in the form of a jet of liquid into a zone of intense agitation located below the level of the reaction mixture. The reaction proceeds rapidly to produce the desired solid, plastic, elastic polymer.

The interpolymer may be combined with sulfur and appropriate fillers, plasticizers and the like, and with suitable sulfurization aids such as "Tuads" (tetramethyl thiuram disulfide). The interpolymer, when so compounded, may be cured into an elastic, rubber-like substance having an elastic limit, a high tensile strength and a high elongation by the application of heat within a temperature range of 135° C. to 185° C. for a time interval ranging from 15 to 120 minutes.

Example 1

A mixture of 99 parts of liquid isobutylene was prepared with one part of 2-methyl hexadiene-1,5, and 4 volumes of liquid ethylene were added to the mixed olefins. The mixture was prepared in a reactor equipped with a powerful stirring device and provided with a cover to avoid loss of volatilized gaseous constituents. The reactor also was well heat insulated to reduce the rate of volatilization of the refrigerant by ambient heat. The catalyst was prepared by dissolving commercial anhydrous aluminum chloride in methyl chloride at the boiling point of the methyl chloride to yield a saturated solution containing about 1.2 g. of aluminum chloride per 100 cc. of solution. This solution was then diluted with an additional amount of methyl chloride to produce a solution containing approximately 0.5 g. of dissolved aluminum chloride per 100 cc. This solution was then precooled to a temperature of approximately −78° C. and sprayed on to the surface of the vigorously stirred mixed olefins through a spray nozzle. The polymerization proceeded rapidly and was approximately 80% complete in about 5 minutes.

When this stage of polymerization was reached, the polymerization mixture was diluted with approximately ½ volume of isopropyl alcohol to quench the catalyst and arrest polymerization. The solid polymer was then brought up to room temperature and was ready for further processing, including compounding.

Example 2

The interpolymer of isobutylene and 2-methyl hexadiene-1,5 was then compounded according to the following formula:

| | Parts |
|---|---|
| Interpolymer | 100 |
| Zinc oxide | 5 |
| Stearic acid | 3 |
| Sulfur | 3 |
| Tuads | 1 |

In preparing this compound, the interpolymer was worked briefly upon the mill for a time interval of approximately 5 minutes. Then the zinc oxide was added and thoroughly incorporated into the polymer by further working on the mill. Thereafter, the stearic acid and sulfur were similarly added, the mill temperature during this portion of the operation being maintained at approximately 140° C. When these ingredients were thoroughly incorporated, the mill was cooled to a temperature of approximately 40° C., the Tuads added, and the compound removed from the mill.

This prepared compound was then placed in a mold and cured at a temperature of 155° C. for 60 minutes to produce the desired cured rubber-like polymer.

Example 3

A series of polymerizations as shown in Example 1 were conducted, using varying proportions of isoolefin and the tertiary diolefin, the proportions ranging from 99 parts of isobutylene with 1 part of 2-methyl hexadiene-1,5 to 96 parts of isobutylene with one to 4 parts of 2-methyl hexadiene-1,5. These several polymers were compounded and cured as outlined in Example 2, and the tensile strength and elongations determined for the cured compounds, together with the molecular weight and percent of unsaturation of the raw polymer. The values are shown in the following table:

| Per cent methyl hexadine | Polymer | | Pure gum cures | |
|---|---|---|---|---|
| | Unsat. | Mol. wt. | Tensile strength, 60' | Per cent elongation, 60' |
| 1 | 0.47 | 56,000 | 2,165 | 950 |
| 2 | 0.74 | 40,000 | 2,270 | 1,025 |
| 3 | | 23,000 | 2,225 | 950 |
| 4 | 1.18 | 31,000 | 2,090 | 900 |
| 4 | 1.08 | 27,000 | 2,100 | 900 |

The percent unsaturation is determined by the Weijs method of iodine chloride addition and the results expressed on the basis of the mol percentage of diolefin unit indicated to be present in the polymer.

Example 4

An olefinic mixture containing isobutylene in the proportion of 98 parts of 2-methyl pentadiene-1,4 in the proportion of 2 parts was prepared as in Example 1 and polymerized in the presence of liquid ethylene as a diluent-refrigerant by the application of a similar catalyst to produce a high grade polymer which was compounded as shown in Example 2 to produce a strong, elastic, rubber-like substance.

Thus the invention provides a new and useful interpolymer of an isoolefin with a tertiary diolefin in which the chemical unsaturation for sulfur reactivity occurs principally in the side chains.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of a non-conjugated aliphatic diolefin having 5 to 8, inclusive, carbon atoms per molecule, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

2. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of a non-conjugated tertiary diolefin having the formula:

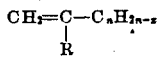

in which R is an alkyl group; $n$ is a whole number greater than 2 and $x$ is an uneven number, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

3. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of 2-methyl hexadiene-1,5, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

4. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of 2-methyl heptadiene-1,6, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

5. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of 2-methyl heptadiene-1,4, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

6. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of a non-conjugated tertiary diolefin having a terminal double bond attached to a tertiary carbon atom, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

7. The process of preparing a solid, plastic, hydrocarbon interpolymer which is reactive with sulfur to give an elastic product comprising the steps of reacting together a major proportion of an aliphatic iso-olefin having 4 to 7, inclusive, carbon atoms per molecule, with a minor proportion of a non-conjugated tertiary diolefin having a terminal double bond attached to a tertiary carbon atom having 5 to 8, inclusive, carbon atoms per molecule, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

8. A synthetic, solid, plastic, hydrocarbon interpolymer of a major proportion of an iso-olefin having less than 8 carbon atoms per molecule with a minor proportion of a non-conjugated tertiary diolefin having the formula:

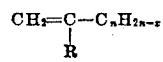

in which R is an alkyl group, $n$ is a whole number greater than 2 and $x$ is any uneven number, the said polymer being characterized by a low unsaturation below an iodine number of 50, a molecular weight above 15,000 and reactivity with sulfur to yield a product of increased elasticity.

9. A synthetic, solid, plastic, hydrocarbon interpolymer of a major proportion of an iso-olefin having less than 8 carbon atoms per molecule with a minor proportion of a non-conjugated tertiary diolefin, the said polymer being characterized by a low unsaturation below an iodine number of 50, a molecular weight above 15,000 and reactivity with sulfur to yield a product of increased elasticity.

10. A synthetic, solid, plastic, hydrocarbon interpolymer of a major proportion of an iso-olefin having less than 8 carbon atoms per molecule with a minor proportion of a non-conjugated tertiary diolefin having 5 to 8, inclusive, carbon atoms per molecule, the said polymer being characterized by a low unsaturation below an iodine number of 50, a molecular weight above 15,000 and reactivity with sulfur to yield a product of increased elasticity.

11. A synthetic, solid, plastic, hydrocarbon interpolymer of a major proportion of an iso-olefin having less than 8 carbon atoms per molecule with a minor proportion of 2-methyl hexadiene-1,5, the said polymer being characterized by a low unsaturation below an iodine number of 50, a molecular weight above 15,000 and reactivity with sulfur to yield a product of increased elasticity.

12. A synthetic, solid, plastic, hydrocarbon interpolymer of a major proportion of an iso-olefin having less than 8 carbon atoms per molecule with a minor proportion of 2-methyl pentadiene-1,4, the said polymer being characterized by a low unsaturation below an iodine number of 50, a molecular weight above 15,000 and reactivity with sulfur to yield a product of increased elasticity.

13. A synthetic, solid, plastic, hydrocarbon interpolymer of a major proportion of an iso-olefin having less than 8 carbon atoms per molecule with a minor proportion of 2-methyl heptadiene-1,6, the said polymer being characterized by a low unsaturation below an iodine number of 50, a molecular weight above 15,000 and reactivity with sulfur to yield a product of increased elasticity.

14. A synthetic, solid, plastic, hydrocarbon interpolymer of a major proportion of isobutylene with a minor proportion of a non-conjugated tertiary diolefin having the formula:

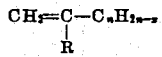

in which R is an alkyl group; $n$ is a whole number greater than 2 and $x$ is any uneven number, the polymer being characterized by a low unsaturation below an iodine number of 50, a molecular weight above 15,000 and reactivity with sulfur to yield an elastic product.

15. A synthetic, solid, plastic, hydrocarbon interpolymer of a major proportion of isobutylene with a minor proportion of a non-conjugated tertiary diolefin, the polymer being characterized by a low unsaturation below an iodine number of 50, a molecular weight above 15,000, and reactivity with sulfur to yield an elastic product.

16. A synthetic, solid, plastic, hydrocarbon interpolymer of a major proportion of isbutylene with a minor proportion of a non-conjugated tertiary diolefin having 5 to 8, inclusive, carbon atoms per molecule, the polymer being characterized by a low unsaturation below an iodine number of 50, a molecular weight above 15,000, and reactivity with sulfur to yield an elastic product.

17. A synthetic, solid, plastic, hydrocarbon interpolymer of a major proportion of isobutylene with a minor proportion of 2-methyl hexadiene-1,5, the polymer being characterized by a low unsaturation below an iodine number of 50, a molecular weight above 15,000, and reactivity with sulfur to yield an elastic product.

18. A synthetic, solid, plastic, hydrocarbon interpolymer of a major proportion of isobutylene with a minor proportion of 2-methyl pentadiene-1,4, the polymer being characterized by a low unsaturation below an iodine number of 50, a molecular weight above 15,000, and reactivity with sulfur to yield an elastic product.

19. A synthetic, solid, plastic, hydrocarbon interpolymer of a major proportion of isobutylene with a minor proportion of 2-methyl heptadiene-1,6, the polymer being characterized by a low unsaturation below an iodine number of 50, a molecular weight above 15,000, and reactivity with sulfur to yield an elastic product.

20. A cured, synthetic, solid, elastic hydrocarbon interpolymer of a major proportion of an iso-olefin having less than 8 carbon atoms per molecule with a minor proportion of a non-conjugated tertiary diolefin having the formula:

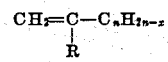

in which R is an alkyl group; $n$ is a whole number greater than 2 and $x$ is any uneven number, said cured elastic polymer having an elastic limit and a tensile strength at break above 1,000 lbs. per square inch.

21. A cured, synthetic, solid, elastic hydrocarbon interpolymer of a major proportion of an iso-olefin having less than 8 carbon atoms per molecule with a minor proportion of a non-conjugated tertiary diolefin, said cured elastic polymer having an elastic limit and a tensile strength at break above 1,000 lbs. per square inch.

22. A cured, synthetic, solid, elastic hydrocarbon interpolymer of a major proportion of an iso-olefin having less than 8 carbon atoms per molecule with a minor proportion of a non-conjugated tertiary diolefin having 5 to 8, inclusive, carbon atoms per molecule, said cured elastic polymer having an elastic limit and a tensile strength at break above 1,000 lbs. per square inch.

23. A cured, synthetic, solid, elastic hydrocarbon interpolymer of a major proportion of an iso-olefin having less than 8 carbon atoms per molecule with a minor proportion of 2-methyl hexadiene-1,5, said cured elastic polymer having an elastic limit and a tensile strength at break above 1,000 lbs. per square inch.

24. A cured, synthetic, solid, elastic hydrocarbon interpolymer of a major proportion of an iso-olefin having less than 8 carbon atoms per molecule with a minor proportion of 2-methyl pentadiene-1,4, said cured elastic polymer having an elastic limit and a tensile strength at break above 1,000 lbs. per square inch.

25. A cured, synthetic, solid, elastic hydrocarbon interpolymer of a major proportion of an iso-olefin having less than 8 carbon atoms per molecule with a minor proportion of 2-methyl heptadiene-1,6, said cured elastic polymer having an elastic limit and a tensile strength at break above 1,000 lbs. per square inch.

26. A cured, synthetic, solid, elastic sulfurized hydrocarbon interpolymer of a major proportion of isobutylene with a minor proportion of a non-conjugated tertiary diolefin having the formula:

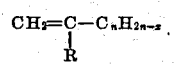

in which R is an alkyl group; $n$ is a whole number greater than 2 and $x$ is any uneven number, said cured elastic polymer having an elastic limit, a tensile strength above 1,000 lbs. per square inch, and an elongation at break ranging up to 1100%.

27. A cured, synthetic, solid, elastic sulfurized hydrocarbon interpolymer of a major proportion of isobutylene with a minor proportion of a non-conjugated tertiary diolefin, said cured elastic polymer having an elastic limit, a tensile strength above 1,000 lbs. per square inch, and an elongation at break ranging up to 1100%.

28. A cured, synthetic, solid, elastic sulfurized hydrocarbon interpolymer of a major proportion of isobutylene with a minor proportion of a non-conjugated tertiary diolefin having 5 to 8, inclusive, carbon atoms per molecule, said cured elastic polymer having an elastic limit, a tensile strength above 1,000 lbs. per square inch, and an elongation at break ranging up to 1100%.

29. A cured, synthetic, solid, elastic sulfurized hydrocarbon interpolymer of a major proportion of isobutylene with a minor proportion of 2-methyl hexadiene-1,5, said cured elastic polymer having an elastic limit, a tensile strength above 1,000 lbs. per square inch, and an elongation at break ranging up to 1100%.

30. A cured, synthetic, solid, elastic sulfurized hydrocarbon interpolymer of a major proportion of isobutylene with a minor proportion of 2-methyl pentadiene-1,4, said cured elastic polymer having an elastic limit, a tensile strength above 1,000 lbs. per square inch, and an elongation at break ranging up to 1100%.

31. A cured, synthetic, solid, elastic sulfurized hydrocarbon interpolymer of a major proportion of isobutylene with a minor proportion of 2-methyl heptadiene-1,6, said cured elastic polymer having an elastic limit, a tensile strength above 1,000 lbs. per square inch, and an elongation at break ranging up to 1100%.

WILLIAM J. SPARKS.
ROBERT M. THOMAS.